(12) United States Patent
Munz et al.

(10) Patent No.: US 12,185,119 B2
(45) Date of Patent: Dec. 31, 2024

(54) TRANSMITTING A COMMUNICATION ON A FIRST CHANNEL OR A SECOND CHANNEL

(71) Applicant: Telefonaktiebolaget LM Ericsson (publ), Stockholm (SE)

(72) Inventors: Hubertus Munz, Aachen (DE); Alexandros Palaios, Moers (DE); Dhruvin Patel, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 334 days.

(21) Appl. No.: 17/615,944

(22) PCT Filed: Jun. 4, 2019

(86) PCT No.: PCT/EP2019/064440
§ 371 (c)(1),
(2) Date: Dec. 2, 2021

(87) PCT Pub. No.: WO2020/244739
PCT Pub. Date: Dec. 10, 2020

(65) Prior Publication Data
US 2022/0322440 A1  Oct. 6, 2022

(51) Int. Cl.
*H04W 72/04* (2023.01)
*H04W 16/14* (2009.01)
(Continued)

(52) U.S. Cl.
CPC ........... *H04W 16/14* (2013.01); *H04W 24/08* (2013.01); *H04W 36/22* (2013.01); *H04W 48/18* (2013.01);
(Continued)

(58) Field of Classification Search
CPC ..... H04W 16/14; H04W 24/08; H04W 36/22; H04W 48/18; H04W 48/20;
(Continued)

(56) References Cited

U.S. PATENT DOCUMENTS

2009/0046655 A1  2/2009 Zhao et al.
2009/0286541 A1  11/2009 Maheshwari et al.
(Continued)

FOREIGN PATENT DOCUMENTS

WO     2016010276 A1      1/2016
WO     WO-2016164584 A1 * 10/2016  ............ H04W 16/14
(Continued)

OTHER PUBLICATIONS

Discussion on HARQ operation for LAA, 3GPP TSG RAN WG1 Meeting #80, R1-150633; Athens, Greece, Feb. 9-13, 2015, 1-12 (Year: 2015).*
(Continued)

*Primary Examiner* — Lan-Huong Truong
(74) *Attorney, Agent, or Firm* — Murphy, Bilak & Homiller, PLLC

(57) ABSTRACT

A method is disclosed of transmitting a communication. The method comprises performing a Clear Channel Assessment, CCA, procedure on a first channel in unlicensed spectrum, and, if the CCA procedure indicates that the first channel is occupied for at least a predetermined period, transmitting the communication on a second channel in licensed spectrum.

18 Claims, 2 Drawing Sheets

(51) Int. Cl.

| | | |
|---|---|---|
| H04W 24/08 | (2009.01) | |
| H04W 36/22 | (2009.01) | |
| H04W 48/18 | (2009.01) | |
| H04W 48/20 | (2009.01) | |
| H04W 72/0446 | (2023.01) | |
| H04W 72/0453 | (2023.01) | |
| H04W 72/1263 | (2023.01) | |
| H04W 72/23 | (2023.01) | |
| H04W 74/08 | (2009.01) | |
| H04W 74/0808 | (2024.01) | |
| H04W 74/0816 | (2024.01) | |
| H04W 36/14 | (2009.01) | |
| H04W 80/02 | (2009.01) | |

(52) U.S. Cl.
CPC ....... *H04W 48/20* (2013.01); *H04W 72/0446* (2013.01); *H04W 72/0453* (2013.01); *H04W 72/1263* (2013.01); *H04W 72/23* (2023.01); *H04W 74/0808* (2013.01); *H04W 74/0816* (2013.01); *H04W 74/0866* (2013.01); *H04W 36/1446* (2023.05); *H04W 80/02* (2013.01)

(58) Field of Classification Search
CPC ......... H04W 72/0446; H04W 72/0453; H04W 72/1263; H04W 72/23; H04W 74/0808; H04W 74/0816; H04W 74/0866; H04W 80/02; H04W 36/0009; H04W 36/0085; H04W 36/14; H04W 72/1215; H04W 36/26; H04L 1/08
See application file for complete search history.

(56) References Cited

U.S. PATENT DOCUMENTS

| | | |
|---|---|---|
| 2011/0007672 A1 | 1/2011 | Kim et al. |
| 2012/0269180 A1 | 10/2012 | Li et al. |
| 2012/0320881 A1 | 12/2012 | Hong et al. |
| 2014/0321376 A1 | 10/2014 | Damnjanovic et al. |
| 2014/0362780 A1* | 12/2014 | Malladi ............... H04W 72/542 370/329 |
| 2015/0110018 A1 | 4/2015 | Rosa et al. |
| 2016/0050667 A1 | 2/2016 | Papasakellariou et al. |
| 2016/0227425 A1 | 8/2016 | Kim et al. |
| 2016/0255643 A1* | 9/2016 | Malik ............... H04W 72/1215 370/329 |
| 2017/0202007 A1 | 7/2017 | Miao et al. |
| 2017/0231013 A1 | 8/2017 | Ahn et al. |
| 2017/0279565 A1 | 9/2017 | Han et al. |
| 2017/0353972 A1 | 12/2017 | Babaei et al. |
| 2018/0084509 A1 | 3/2018 | Lee et al. |
| 2018/0103458 A1 | 4/2018 | Tooher et al. |
| 2018/0124612 A1 | 5/2018 | Babaei et al. |
| 2018/0167823 A1 | 6/2018 | Uchino et al. |
| 2018/0184475 A1 | 6/2018 | Babaei et al. |
| 2018/0288623 A1 | 10/2018 | Hampel et al. |
| 2019/0098606 A1 | 3/2019 | Sharma et al. |
| 2019/0173611 A1* | 6/2019 | Liu ....................... H04L 1/0013 |
| 2019/0349979 A1 | 11/2019 | Park et al. |
| 2019/0380042 A1 | 12/2019 | Niu et al. |
| 2020/0100116 A1 | 3/2020 | Chakraborty et al. |
| 2020/0107373 A1 | 4/2020 | Roy et al. |
| 2020/0275430 A1 | 8/2020 | Salem |
| 2020/0305052 A1 | 9/2020 | Yoshino et al. |
| 2020/0314891 A1 | 10/2020 | Li et al. |
| 2020/0351669 A1 | 11/2020 | Xu et al. |
| 2021/0345332 A1 | 11/2021 | He et al. |
| 2021/0352644 A1 | 11/2021 | Zhou |
| 2021/0392683 A1 | 12/2021 | Awadin et al. |

FOREIGN PATENT DOCUMENTS

| | | |
|---|---|---|
| WO | 2017014937 A1 | 1/2017 |
| WO | 2017134624 A1 | 8/2017 |
| WO | 2018052349 A1 | 3/2018 |
| WO | 2020244739 A1 | 12/2020 |

OTHER PUBLICATIONS

3GPP, "3rd Generation Partnership Project; Technical Specification Group Radio Access Network; NR; Medium Access Control (MAC) protocol specification (Release 15)", 3GPP TS 38.321 V15.5.0, Mar. 2019, 1-78.

3GPP, "3rd Generation Partnership Project; Technical Specification Group Radio Access Network; NR; Physical layer procedures for control (Release 15)", 3GPP TS 38.213 V15.5.0, Mar. 2019, 1-104.

3GPP, "3rd Generation Partnership Project; Technical Specification Group Radio Access Network; NR; Radio Resource Control (RRC) protocol specification (Release 15)", 3GPP TS 38.331 V15.5.1, Apr. 2019, 1-491.

3GPP, "3rd Generation Partnership Project; Technical Specification Group Services and System Aspects; Procedures for the 5G System; Stage 2 (Release 16)", 3GPP TS 23.502 V16.0.2, Apr. 2019, 1-290.

Unknown, Author, "Discussion on HARQ operation for LAA", 3GPP TSG RAN WG1 Meeting #80, R1-150633, Athens, Greece, Feb. 9-13, 2015, 1-12.

Unknown, Author, "ETSI EN 301 893 V2.1.1", 5 GHJz RLAN; Harmonised Standard covering the essential requirements of article 3.2 of Directive 2014/53/EU, May 2017, 1-122.

Unknown, Author, "ETSI TS 138 300 V15.6.0", 5G; NR; Overall description; Stage-2 (3GPP TS 38.300 version 15.6.0 Release 15), Jul. 2019, 1-102.

Unknown, Author, "Further aspects of data duplication in PDCP layer", 3GPP TSG-RAN WG2 #97, Tdoc R2-1700834, Athens, Greece, Feb. 13-17, 2017, 1-3.

Unknown, Author, "HARQ retransmissions on LAA", 3GPP TSG-RAN WG2 #89; R2-150268; Athens, Greece, Feb. 9-13, 2015, 1-4.

Unknown, Author, "New WID: Support of NR Industrial Internet of Things (IoT)", 3GPP TSG RAN Meeting #83; RP-190728; Shenzhen, China, Mar. 18-21, 2019, 1-6.

Unknown, Author, "Revised WID on NR-based Access to Unlicensed Spectrum", 3GPP TSG RAN Meeting #83; RP-190706; Shenzhen, China, Mar. 18-21, 2019, 1-8.

Unknown, Author, "Timing and Synchronization for Time-Sensitive Applications", IEEE P802.1AS-Rev/D7.3, Draft Standard for Local and Metropolitan Area Networks, LAN/MAN Standards Committee of the IEEE Computer Society, Aug. 2, 2018, 1-502.

Unknown, Author, "Broadband Radio Access Networks (BRAN); 5 GHz high performance RLAN; Harmonized EN covering the essential requirements of article 3.2 of the R&TTE Directive", ETSI EN 301 893 V1.8.1, Mar. 2015, 1-93.

Unknown, Author, "QoS Control in LAA UL Operation", 3GPP TSG-RAN WG2 Meeting #89bis, R2-151176, Bratislava, Slovakia, Apr. 20-24, 2015, 1-4.

* cited by examiner

TRANSMITTING A COMMUNICATION ON A FIRST CHANNEL OR A SECOND CHANNEL

TECHNICAL FIELD

Examples of the present disclosure relate to transmitting a communication on a first channel, for example in unlicensed spectrum, or a second channel, for example in licensed spectrum.

BACKGROUND

3GPP radio technologies, such as for example Long Term Evolution (LTE) or New Radio (NR), may be used in licensed spectrum. Initiatives like License Assisted Access (LAA), MulteFire and NR-U are solutions to use LTE and NR in unlicensed spectrum. Using unlicensed spectrum may increase the overall capacity of a network if used in parallel to licensed spectrum.

Using unlicensed spectrum, such as for example industrial, scientific and medical (ISM) radio bands, may require the use of Listen Before Talk (LBT) Medium Access Control (MAC) schemes, in which a transmitter first senses that the transmission medium is free before using it for transmissions.

SUMMARY

One aspect of this disclosure provides a method of transmitting a communication. The method comprises performing a Clear Channel Assessment, CCA, procedure on a first channel in unlicensed spectrum. The method also comprises, if the CCA procedure indicates that the first channel is occupied for at least a predetermined period, transmitting the communication on a second channel in licensed spectrum.

Another aspect of this disclosure provides a method in a network node. The method comprises determining that a first channel in unlicensed spectrum is occupied for at least a predetermined period. The method also comprises causing each of at least one wireless device to switch from transmitting communications associated with a respective logical channel on the first channel in unlicensed spectrum to transmitting the communications on a second channel in licensed spectrum.

A further aspect of this disclosure provides apparatus for transmitting a communication. The apparatus comprises a processor and a memory. The memory contains instructions executable by the processor such that the apparatus is operable to perform a Clear Channel Assessment, CCA, procedure on a first channel in unlicensed spectrum, and, if the CCA procedure indicates that the first channel is occupied for at least a predetermined period, transmit the communication on a second channel in licensed spectrum.

A still further aspect of this disclosure provides a network node comprising a processor and a memory. The memory contains instructions executable by the processor such that the apparatus is operable to determine that a first channel in unlicensed spectrum is occupied for at least a predetermined period, and cause each of at least one wireless device to switch from transmitting communications associated with a respective logical channel on the first channel in unlicensed spectrum to transmitting the communications on a second channel in licensed spectrum.

An additional aspect of this disclosure provides apparatus for transmitting a communication. The apparatus is configured to perform a Clear Channel Assessment, CCA, procedure on a first channel in unlicensed spectrum, and, if the CCA procedure indicates that the first channel is occupied for at least a predetermined period, transmit the communication on a second channel in licensed spectrum.

Another aspect of this disclosure provides a network node configured to determine that a first channel in unlicensed spectrum is occupied for at least a predetermined period, and cause each of at least one wireless device to switch from transmitting communications associated with a respective logical channel on the first channel in unlicensed spectrum to transmitting the communications on a second channel in licensed spectrum.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
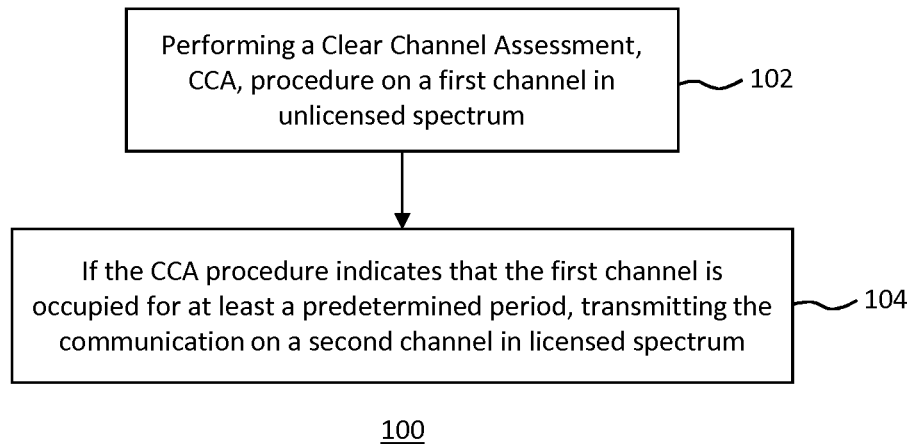
FIG. 1 is a flow chart of an example of a method of transmitting a communication.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Using unlicensed spectrum and/or Listen Before Talk (LBT) procedures can in some cases cause problems for applications that have a fixed upper bound on the latency of related communications. Additionally or alternatively, applications supporting high reliability and deterministic latency, such as for example URLLC (Ultra Reliable Low-Latency Communications) or HRLLC (Highly Reliable Low-Latency Communications) schemes. Even in that case, if the latency offered by unlicensed bands is fine there are still applications that require high reliability and/or more capacity. In particular, it is not known at a particular time whether unlicensed spectrum is occupied (e.g. by other radio technologies such as Wi-Fi) or can be used for transmissions, and a transmitter may wait for a channel in unlicensed spectrum to be free (e.g. no usage of the channel is detected) before it can begin transmissions. Hence, the latency of communications using that channel cannot easily be predicted or controlled.

In some embodiments disclosed herein, before any transmission, for example uplink or downlink transmission, when unlicensed spectrum shall be used, an LBT or CCA procedure may be performed by a wireless device (e.g. UE) or base station (BS). This channel access procedure may be implemented using a timer. The timer may check whether the LBT/CCA procedure exceeds a predetermined time period. This predetermined time period may be less than an application- or network-dependent maximum allowable latency, and may in some examples be selected for each BS-UE link individually. In case the timer expires, an unlicensed channel (the channel that is being listened to during the LBT/CCA procedure) is assumed to be occupied, and a switching procedure to a licensed channel is performed. This may in some examples subsequently involve a 3GPP mechanism for channel access, e.g. in UL and DL in licensed channels. To avoid a QoS degradation for a prolonged period of time, in some examples, the use of the unlicensed channel may be avoided, at least for an additional period of time for example. After the additional period of time, the UE or BS may switch back to attempting to use the unlicensed channel. In further embodiments, a management instance may be provided, for example in the core network, that is informed about the timer expiration. This instance may for example manage the use of unlicensed spectrum for multiple adjacent BSs and may mandate the use of unlicensed channels. The instance may collect information from all BSs and enable and disable the use of certain unlicensed channels in the BSs or a subset of the BSs. For example, the instance may disable the use of unlicensed spectrum or unlicensed channel(s) following a message from a base station that an unlicensed channel is occupied, and re-enable the use of unlicensed spectrum or channel(s) after a predetermined time, or following a determination that the spectrum or channel(s) is once again free (e.g. following monitoring the spectrum or channel(s)).

FIG. 1 is a flow chart of an example of a method 100 of transmitting a communication. The method can be implemented in some examples by a transmitter, for example a wireless device/user equipment (UE) or a base station such as an eNB or gNB. The method 100 comprises, in step 102, performing a Clear Channel Assessment, CCA, procedure on a first channel in unlicensed spectrum. The CCA procedure may be for example part of a LBT procedure and may determine whether the channel is free for transmissions, or whether it is occupied, e.g. another transmitter is currently transmitting using that channel. The method 100 also comprises, in step 104, if the CCA procedure indicates that the first channel is occupied for at least a predetermined period, transmitting the communication on a second channel in licensed spectrum. In some examples, the method 100 may also comprise, if the CCA procedure indicates that the first channel is available within the predetermined period, transmitting the communication on the first channel in unlicensed spectrum.

Thus, for example, maximum latency of a communication may be guaranteed in some cases by switching to a channel in licensed spectrum before the delay before transmission of the communication becomes too large. However, attempting first to use the channel in unlicensed spectrum may for example increase the overall capacity of the network where using the unlicensed spectrum to transmit the communication is successful.

In some examples, the predetermined time is less than a maximum allowable latency for the communication. As a result, for example, the latency target for a communication can always be met. The predetermined time may be for example less than or equal to the maximum allowable latency for the communication minus a channel switching time for switching to the second channel minus a transmission time for the communication on the second channel in licensed spectrum. This is exemplified in the example equation below:

$$T\_CCA \leq \text{maximum allowable latency} - \text{a channel switching time for switching to the second channel} - \text{transmission time over second channel} \quad (1)$$

In equation (1) above, T_CCA is the predetermined time to perform the CCA procedure to attempt to transmit using the first channel in unlicensed spectrum, before transmitting the communication on the second channel in licensed spectrum instead. The transmission time over the second channel may be an estimated time and may in some examples be more predictable and/or guaranteed than transmissions on the first channel.

In some examples, the method 100 comprises starting a timer, and determining an expiry of the predetermined period by determining expiry of the timer. The timer may be started e.g. upon creation or receipt (e.g. from a higher layer) of the communication, or upon commencement of the CCA procedure. The timer may be implemented for example in a PDCP layer, a RLC layer or a MAC layer.

The communication may for example be associated with a logical channel. The method 100 then comprises, after transmitting the communication on the second channel in licensed spectrum, transmitting one or more subsequent communications associated with the logical channel on the second channel in licensed spectrum. Therefore, the CCA procedure may not be carried out for the subsequent communications, ensuring low latency and/or high reliability for these communications for example. In some examples, subsequent communications may skip the CCA procedure and be transmitted on the second channel in licensed spectrum for a certain time period, before communications on the logical channel are again first attempted for transmission on the first channel in unlicensed spectrum via the CCA procedure.

In some examples, the method 100 may comprise transmitting a duplicate of the communication on the second channel in licensed spectrum or a third channel in licensed spectrum within the predetermined period. For example, Frame Replication and Elimination Redundancy (FRER) may be employed. In other examples, a communication may be transmitted on channel A in unlicensed spectrum, and a duplicate transmitted on channel B. The channel B may be in licensed or unlicensed spectrum. If transmission on an unlicensed channel is unsuccessful, e.g. if the CCA or LBT procedure does not indicate that the channel is available within the predetermined period as suggested herein, transmission may be switched from that channel to another channel in licensed or unlicensed spectrum.

In examples where the method 100 is implemented in a wireless device, the communication may be transmitted to a base station. Thus, for example, transmitting the communication on the second channel in licensed spectrum in step 104 may in some examples comprise transmitting a scheduling request to the base station, and transmitting the communication after receiving a scheduling grant from the base station. Thus, for example, the communication may be transmitted on the second channel in response to a scheduling grant for transmission on the second channel in licensed spectrum.

In examples where the method 100 is implemented in a base station, the communication may be transmitted to a wireless device or UE. In such examples, if the CCA procedure indicates that the first channel is occupied for at least the predetermined period, the method 100 may include causing the wireless device and/or at least one further wireless device to use licensed spectrum instead of unlicensed spectrum for at least some communications. Causing other wireless device(s) to use licensed spectrum instead of unlicensed spectrum may comprise for example sending messages to these devices, or sending a message to one or more other base stations. The other base stations may then transmit in licensed spectrum and/or cause wireless device (s) to transmit in licensed spectrum instead of unlicensed spectrum.

Particular embodiments may be implemented using private or campus networks, which are typically smaller than public cellular networks and thus may span a limited geographical area. A device not connected to the network but using the unlicensed first channel (or a neighbouring or nearby channel) may affect devices in the network wherever they may be in the network, and hence all base stations may be informed to use the licensed spectrum instead, or not to use the unlicensed first channel. In this or other embodiments, only nearby base stations e.g. one or more neighbouring base stations may be informed in this manner.

Figure 2:
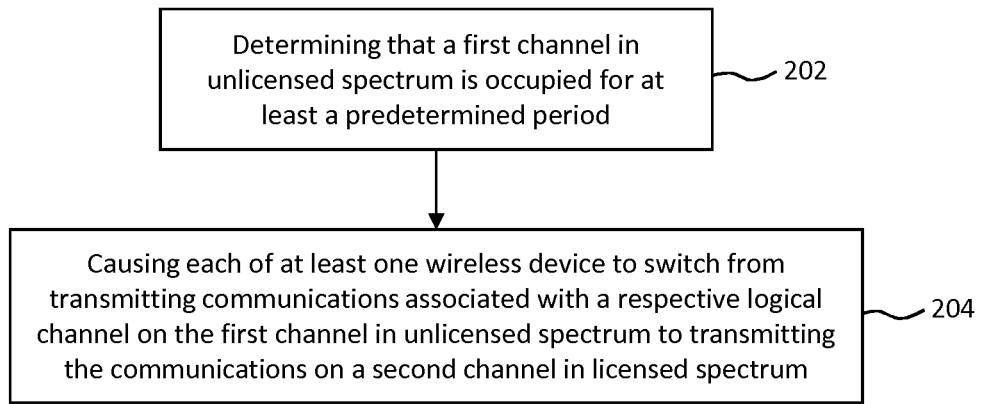
FIG. 2 is a flow chart of an example of a method in a network node.

FIG. 2 is a flow chart of an example of a method 200 in a network node. The network node may be for example a base station, network controller, core network node or other network node. The method 200 comprises, in step 202, determining that a first channel in unlicensed spectrum is occupied for at least a predetermined period. For example, a CCA or LBT procedure may be performed. Alternatively, the network node may receive a notification or message from a wireless device (e.g. UE) or base station that the channel is or was occupied, or that licensed spectrum should be used. The method 200 also comprises, in step 204, causing each of at least one wireless device to switch from transmitting communications associated with a respective logical channel on the first channel in unlicensed spectrum to transmitting the communications on a second channel in licensed spectrum. Causing each of the at least one wireless device to switch in this manner may comprise sending a message to each device and/or sending a message to a base station associated with (e.g. serving) each device.

Communications using the logical channel may thus be sent in some cases on the second channel in licensed spectrum, after first attempting transmission on the first channel in licensed spectrum. However, other communications, e.g. those associated with other logical channel(s), may be sent exclusively on other channels in licensed or unlicensed spectrum.

In some examples, determining that a first channel in unlicensed spectrum is occupied for at least a predetermined period comprises receiving an indication from one of the at least one wireless device or another wireless device that the first channel in unlicensed spectrum is occupied for at least the predetermined period. The indication may be received directly (e.g. from a wireless device, where the network node is a base station) or via or from a base station.

In some examples, the method 200 comprises sending an indication to at least one base station that the first channel in unlicensed spectrum is occupied for at least the predetermined period. The base station may for example then use licensed spectrum instead of unlicensed spectrum, and/or send a message to one or more wireless devices to use licensed spectrum instead of unlicensed spectrum.

In some examples, the at least one wireless device is served by a first base station. The method 200 may further comprise causing at least one further wireless device to switch from transmitting further communications associated with a respective further logical channel on a first further channel in unlicensed spectrum to transmitting the further communications on a second further channel in licensed spectrum, wherein the at least one further wireless device is served by at least one further base station. Thus, for example, the further wireless device(s) may use licensed spectrum instead of unlicensed spectrum even if those further wireless device(s) did not themselves directly determine (e.g. using CCA or LBT) that the unlicensed spectrum or channel was occupied. This may for example improve the latency of communications from those further wireless device(s) as there may be no attempt to use the unlicensed spectrum or channel, which may be occupied. In some examples, causing the at least one further wireless device to switch from transmitting the further communications on the first further channel in unlicensed spectrum to transmitting the further communications on the second further channel in licensed spectrum comprises sending a message to the at least one further base station. This may for example cause the further base station(s) to control or send messages to the further wireless device(s) to cause those device(s) to use licensed spectrum.

Figure 3:
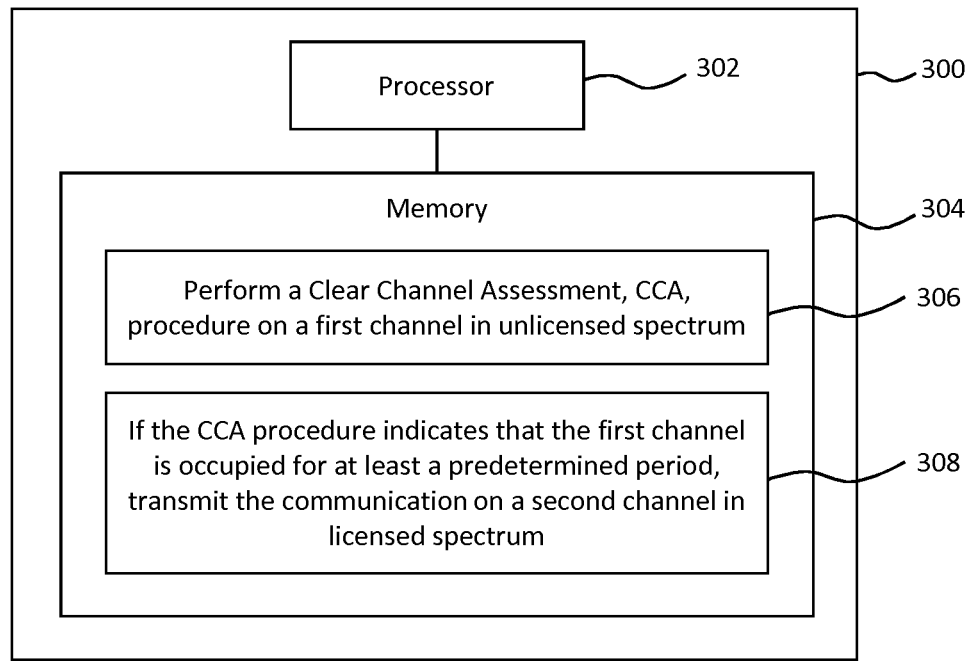
FIG. 3 is a schematic of an example of apparatus for transmitting a communication.

FIG. 3 is a schematic of an example of apparatus 300 for transmitting a communication. The apparatus 300 comprises processing circuitry 302 (e.g. one or more processors) and a memory 304 in communication with the processing circuitry 302. The memory 304 contains instructions executable by the processing circuitry 302. In one embodiment, the memory 304 contains instructions executable by the processing circuitry 302 such that the apparatus 300 is operable to perform (306) a Clear Channel Assessment, CCA, procedure on a first channel in unlicensed spectrum, and, if the CCA procedure indicates that the first channel is occupied for at least a predetermined period, transmit (308) the communication on a second channel in licensed spectrum.

Figure 4:
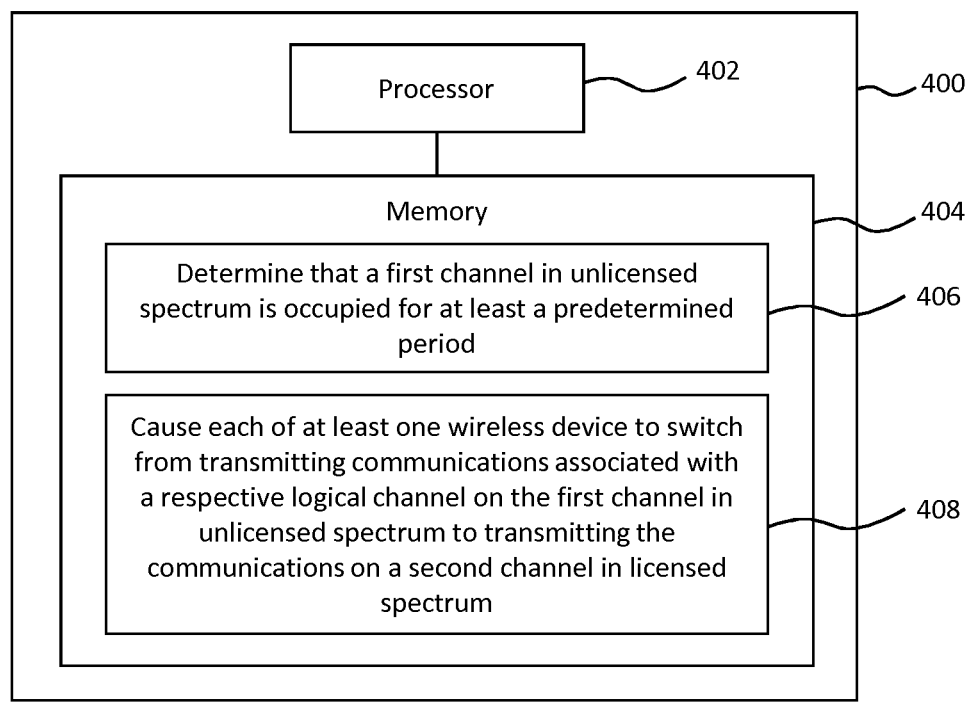
FIG. 4 is a schematic of an example of a network node.

FIG. 4 is a schematic of an example of a network node 400. The apparatus 400 comprises processing circuitry 402 (e.g. one or more processors) and a memory 404 in communication with the processing circuitry 402. The memory 404 contains instructions executable by the processing circuitry 402. In one embodiment, the memory 404 contains instructions executable by the processing circuitry 402 such that the apparatus 400 is operable to determine (406) that a first channel in unlicensed spectrum is occupied for at least a predetermined period, and cause (408) each of at least one wireless device to switch from transmitting communications associated with a respective logical channel on the first channel in unlicensed spectrum to transmitting the communications on a second channel in licensed spectrum.

Additional embodiments will now be described. The use of unlicensed spectrum may require the use of LBT or CCA procedures. In the following, a device that is using the same unlicensed spectrum as a node in a network that also uses licensed spectrum is called an intruder. Both BSs and UEs may need to perform LBT or CCA before any transmission on unlicensed spectrum or on a particular channel in unlicensed spectrum. Therefore, the existence of an intruder can be detected from an unsuccessful LBT or CCA attempt (i.e. the LBT or CCA procedure indicates that the unlicensed spectrum or channel is currently being used).

In some embodiments, this information is shared in the network to detect intruders. In some embodiments, the intruders may also be profiled in terms of one or more of mobility, traffic characteristics, transmit power, network topology etc. A BS or UE using a 3GPP radio technology, such as for example LTE or NR, wishes to use unlicensed spectrum in parallel with licensed spectrum. This may be possible either using unlicensed spectrum next to licensed spectrum, for example as in Licensed Assisted Access (LAA) in LTE, or through standalone unlicensed operation, for example as in MulteFire or NR-U (e.g. if a second licensed radio is available on the BS and/or UE side), or using carrier aggregation. For example, a UE may use NR-U in parallel to licensed NR. This could also be possible in some examples through the deployment of two UEs at a single device, one for NR-U one for NR.

In some embodiments, an instance e.g. in the core network is proposed that collects information about intruders from UEs and/or BSs. The instance may be used to profile intruders and also proactively coordinate the use of unlicensed spectrum in the network. For example, the instance may inform one or more BSs of the detection of an intruder or otherwise to use licensed channels instead of unlicensed channels.

Some critical applications may tolerate communication losses as long as some information is being transmitted within an upper latency bound. This could involve for example a single transmission within a maximum end-to-end latency or multiple transmissions, where only one needs to be transmitted or received within a certain upper bound. LBT is a process that requires time to access a channel. In an ideal case, a channel is idle and can therefore be used immediately. However, in other cases a channel may be used by another device or technology for some time, and may therefore be effectively inaccessible. In the latter case, the latency target (e.g. upper latency bound) may be violated.

In some embodiments, the time for transmission of a communication over the second channel in licensed spectrum can be calculated or estimated based on radio parameter configuration (e.g. one or more of configured grant, no. of HARQ re-transmission, dynamic scheduling etc). The switching time from transmitting on the first channel in unlicensed spectrum (or carrying out the CA or LBT procedure) to transmitting on the second channel in licensed spectrum may also be fixed.

For downlink (DL) transmissions, the BS may schedule a DL transmission for a certain UE at a certain time. Before it is able to start the transmission, it may perform a CCA or LBT procedure. This will be done up to the configured time T_CCA. For example, during the procedure, the BS will sense the channel, and if idle the BS will start to transmit the communication. If not, and the channel was sensed as being occupied, the BS will wait (e.g. for a random back-off period) and perform the sensing again. After T_CCA has expired and if the transmission was not possible (because the channel was not sensed as being available during that time), the BS will switch to the licensed channel and schedule the DL transmission to the UE there. In the licensed channel there may be no need for a CCA or LBT procedure. The BS may also in some examples report that the first, unlicensed channel is intruded (i.e. unavailable) to a central instance. T_CCA may be selected for example based on one or more of the necessary switching time to the licensed channel, the upper latency bound of the application (e.g. QoS demands, Packed Delay Budget), the cell load of the BS, etc.

For uplink (UL) transmissions, the BS may schedule an UL transmission for a certain UE at a certain time. Before the UE can start the transmission, it may perform a CCA or LBT procedure. This will be done up to the configured time T_CCA. For example, during the procedure, the UE will sense the channel, and if idle the UE will start to transmit the communication. If not, and the channel was sensed as being occupied, the UE will wait (e.g. for a random back-off period) and perform the sensing again. After T_CCA has expired and the transmission was not possible (because the channel was not sensed as being available during that time), the UE will switch to the licensed channel send a Scheduling Request (SR) for the UL transmission to the BS. In the licensed channel there may be no need for a CCA or LBT procedure. T_CCA is the maximum time the UE spends on LBT before it considers the channel as intruded and switches to the licensed channel. An intruded channel may in some examples be reported to the central instance by the BS. The BS may know about the failure of the CCA or LBT procedure because of the SR by the UE. T_CCA may be selected for example based on one or more of the necessary switching time to the licensed channel, the upper latency bound of the application (e.g. QoS demands, Packed Delay Budget) etc.

For both UL and DL, a timer may be used, for example on PDCP, RLC or MAC layer, to measure the elapsed time (e.g. since the CCA/LBT procedure was started, or when a communication has been created or received for transmission) and determine if the elapsed time has met or exceeded T_CCA.

Provided below are steps in an example method between one or more BSs and a network node (e.g. in a core network).

0. An intruder is detected as suggested above. The detection of the intruder can be based on for example failure of a CCA or LBT procedure. Detection may be done in some examples by the BS or UEs on any transmission in either control or user plane.
1. In some examples, within the cell served by the BS, critical applications may be either shifted to an unused unlicensed channel or to a licensed spectrum channel to avoid long-lasting QoS degradations. This may depends to an extent on the survival time of the specific use-case.
2. A central entity in the network node is informed about the detection of the intruder; this may include one or more of a time of detection, a potential location of the intruder, the received power from the intruder, traffic characteristics of traffic from the intruder, frequency channel occupation. Alternatively, the central entity will only be sent a notice that the period T_CCA had expired at the UE or BS without the unlicensed channel becoming free. In some examples, the BS may inform the central entity.
3. The central entity may create a profile for this intruder; it may also estimate how much impact the intruder may have to disturb other cells—this may be based for example on one or more of traffic characteristics, mobility, location or transmit power of the intruder. It may inform other BSs to shift traffic away from occupied unlicensed channels to avoid QoS degradations.
4. In the cell the intruder was detected, the profiling of the intruder may continue over time to get a better characterization of the intruder. In case the intruder disappears for a sufficient time, the central entity may also be informed. The central entity may thus in some examples inform one or more BSs or UEs that the unlicensed channel can be used again.

5. In case the intruder moves from one cell to another cell, the central node may also be informed. For example, UEs or a BS for the other cell may detect the intruder.

As a further embodiment, the sensing of intruders might also be performed through receive power measurements performed at a BS or one or more UEs in a cell to get a better understanding of intruders and their behaviour.

Some embodiments disclosed herein may use Frame Replication and Elimination Redundancy (FRER) for communication reliability. Some so-called "ultra-reliable" communications may be able to tolerate the loss of few communications or packets as long as the link is recovered during a specific survival time. For these applications, an unlicensed channel may in some examples be used exclusively while it is available, as long the licensed channel can be established within the survival time.

In some embodiments, methods described herein can be used in cases where a redundant radio link is used, for example in situations a TSN FRER is applied, or Carrier Aggregation (CA) or Dual Carrier (DC). This may apply for example to applications that have a zero or close to zero survival time. In such cases, for example, it is possible that one or both radio links use unlicensed spectrum. An intruder to the unlicensed spectrum might disturb one of the links by appearing in the cell. This may be detected for example by either the BS(s) or UE(s) using methods as described herein. The redundancy may ensure that there is no degradation on the radio performance in terms of latency or capacity, as long as one link is still operational. Methods as described herein may be used in some examples to achieve full redundancy again, by for example moving the affected link to licensed spectrum or an unoccupied unlicensed channel.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim or embodiment, "a" or "an" does not exclude a plurality, and a single processor or other unit may fulfil the functions of several units recited in the statements below. Where the terms, "first", "second" etc are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method of transmitting a communication, the method comprising:
   performing a Clear Channel Assessment (CCA) procedure on a first channel in unlicensed spectrum; and
   if the CCA procedure indicates that the first channel is occupied for at least a predetermined period, transmitting the communication on a second channel in licensed spectrum;
   wherein the method further comprises:
   transmitting a duplicate of the communication on the second channel in licensed spectrum or a third channel in licensed spectrum within the predetermined period.

2. The method of claim 1, wherein the predetermined time is less than a maximum allowable latency for the communication.

3. The method of claim 2, wherein the predetermined time is less than or equal to the maximum allowable latency for the communication minus a channel switching time for switching to the second channel minus a transmission time for the communication on the second channel in licensed spectrum.

4. The method of claim 1, comprising starting a timer, and determining an expiry of the predetermined period by determining expiry of the timer, wherein the timer is implemented in a Packet Data Convergence Protocol (PDCP) layer, a Radio Link Control (RLC) layer or a Medium Access Control (MAC) layer.

5. The method of claim 1, wherein the communication is associated with a logical channel, and the method comprises, after transmitting the communication on the second channel in licensed spectrum, transmitting subsequent communications associated with the logical channel on the second channel in licensed spectrum.

6. The method of claim 1, comprising transmitting the duplicate of the communication according to Frame Replication and Elimination Redundancy (FRER).

7. The method of claim 1, wherein the method is implemented in a wireless device, wherein the communication is transmitted to a base station.

8. The method of claim 1, wherein the method is implemented in a base station, and wherein the communication is transmitted to a wireless device.

9. The method of claim 8, comprising wherein if the CCA procedure indicates that the first channel is occupied for at least the predetermined period, causing the wireless device, or at least one further wireless device, or both, to use licensed spectrum instead of unlicensed spectrum for at least some communications.

10. A method in a network node, the method comprising:
    determining that a first channel in unlicensed spectrum is occupied for at least a predetermined period; and
    causing each of at least one wireless device to switch from transmitting communications associated with a respective logical channel on the first channel in unlicensed spectrum to transmitting the communications on a second channel in licensed spectrum;
    wherein the method further comprises:
    receiving duplicates of the communications on the second channel in licensed spectrum or a third channel in licensed spectrum within the predetermined period.

11. The method of claim 10, wherein determining that a first channel in unlicensed spectrum is occupied for at least a predetermined period comprises at least one of the following:
    performing a Clear Channel Assessment (CCA) procedure or a Listen Before Talk (LBT) procedure on the first channel in unlicensed spectrum,
    receiving an indication from one of the at least one wireless device or another wireless device that the first channel in unlicensed spectrum is occupied for at least the predetermined period and
    receiving a communication associated with the respective logical channel from one of the at least one wireless device.

12. The method of claim 10, comprising sending an indication to at least one base station that the first channel in unlicensed spectrum is occupied for at least the predetermined period.

13. The method of claim 10, wherein the predetermined time is less than a maximum allowable latency for the communications.

14. The method of claim 13, wherein the predetermined time is less than or equal to the maximum allowable latency for the communications minus a channel switching time for the at least one wireless device to switch to the second channel minus a transmission time for the communications on the second channel in licensed spectrum.

15. The method of claim 10, comprising receiving the duplicates of the communications according to Frame Replication and Elimination Redundancy (FRER).

16. The method of claim 10, wherein the at least one wireless device is served by a first base station, and the method further comprises causing at least one further wireless device to switch from transmitting further communications associated with a respective further logical channel on a first further channel in unlicensed spectrum to transmitting the further communications on a second further channel in licensed spectrum, wherein the at least one further wireless device is served by at least one further base station.

17. An apparatus for transmitting a communication, the apparatus comprising a processor and a memory, the memory containing instructions executable by the processor such that the apparatus is operable to:

perform a Clear Channel Assessment (CCA) procedure on a first channel in unlicensed spectrum;

if the CCA procedure indicates that the first channel is occupied for at least a predetermined period, transmit the communication on a second channel in licensed spectrum; and transmit a duplicate of the communication on the second channel in licensed spectrum or a third channel in licensed spectrum within the predetermined period.

18. A network node comprising a processor and a memory, the memory containing instructions executable by the processor such that the apparatus is operable to:

determine that a first channel in unlicensed spectrum is occupied for at least a predetermined period;

cause each of at least one wireless device to switch from transmitting communications associated with a respective logical channel on the first channel in unlicensed spectrum to transmitting the communications on a second channel in licensed spectrum; and receive duplicates of the communications on the second channel in licensed spectrum or a third channel in licensed spectrum within the predetermined period.

* * * * *